US012679044B2

(12) United States Patent
Sozzi et al.

(10) Patent No.: US 12,679,044 B2
(45) Date of Patent: Jul. 14, 2026

(54) PRESSURE ELEMENT AND SEALING DEVICE FOR A PACKAGING ASSEMBLY HAVING A PRESSURE ELEMENT

(71) Applicant: TETRA LAVAL HOLDINGS & FINANCE S.A., Pully (CH)

(72) Inventors: Andrea Sozzi, Modena (IT); Fabio Ricci Curbastro, Ozzano dell' Emilia (IT); Thomas Johansson, Eslöv (SE); Richard Nilsson, Kävlinge (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 167 days.

(21) Appl. No.: 18/245,665

(22) PCT Filed: Sep. 28, 2021

(86) PCT No.: PCT/EP2021/076653
§ 371 (c)(1),
(2) Date: Mar. 16, 2023

(87) PCT Pub. No.: WO2022/078753
PCT Pub. Date: Apr. 21, 2022

(65) Prior Publication Data
US 2023/0356476 A1    Nov. 9, 2023

(30) Foreign Application Priority Data
Oct. 15, 2020    (EP) ..................................... 20201951

(51) Int. Cl.
B29C 65/20        (2006.01)
B29C 65/00        (2006.01)
B29C 65/36        (2006.01)

(52) U.S. Cl.
CPC .......... B29C 66/4312 (2013.01); B29C 65/20 (2013.01); B29C 65/3656 (2013.01);
(Continued)

(58) Field of Classification Search
CPC .......... B29C 66/4312; B29C 66/81457; B29C 65/20
See application file for complete search history.

(56) References Cited

U.S. PATENT DOCUMENTS

2003/0230387 A1* 12/2003 Smith ..................... B29C 66/80
156/581

FOREIGN PATENT DOCUMENTS

CN        202888520 U        4/2013
CN        104768732 A        7/2015
(Continued)

OTHER PUBLICATIONS

International Search Report (PCT/ISA/210) and Written Opinion (PCT/ISA/237) mailed on Dec. 9, 2021, by the European Patent Office as the International Searching Authority for International Application No. PCT/EP2021/076653. 10 pages.
(Continued)

*Primary Examiner* — Daniel Mcnally
(74) *Attorney, Agent, or Firm* — BUCHANAN INGERSOLL & ROONEY PC

(57) ABSTRACT

A pressure element for a sealing device includes a sealing member and a countersealing member facing one another and configured to be pressed against one another to seal therebetween a tube of packaging material adapted to be filled with a pourable product. The pressure element comprises a fitting portion configured to be fitted to the countersealing member and a contact portion defining a contact surface facing, in use, the sealing member and configured to interact with a sealing element of the sealing member to press and seal the tube therebetween. The pressure element comprises at least one engagement element configured to cooperate with a complementary engagement element carried by the countersealing member to guide the pressure
(Continued)

element according to a predetermined orientation during fitting of the pressure element to the countersealing member.

20 Claims, 3 Drawing Sheets

(52) U.S. Cl.
    CPC ........ *B29C 65/368* (2013.01); *B29C 66/1122* (2013.01); *B29C 66/81457* (2013.01); *B29C 66/849* (2013.01)

(56)                      References Cited

FOREIGN PATENT DOCUMENTS

EP          2917021 A1     9/2015
EP          2917021 B1  *  12/2018   ............. B29C 65/20

OTHER PUBLICATIONS

The First Office Action issued on Aug. 15, 2025, by the State Intellectual Property Office of the People's Republic of China in Chinese Patent Application No. 202180066020.7 and an English translation of the Action. (18 pages).

* cited by examiner

PRESSURE ELEMENT AND SEALING DEVICE FOR A PACKAGING ASSEMBLY HAVING A PRESSURE ELEMENT

TECHNICAL FIELD

The present invention relates to a pressure element for a sealing device configured to seal a tube of packaging material adapted to be filled with pourable product, in particular a sealing device of a packaging assembly configured to fill, form, seal, separate and fold packages containing the pourable product starting from the above-mentioned tube of packaging material.

The present invention also relates to a sealing device configured to seal a tube of packaging material adapted to be filled with pourable product and comprising a pressure element adapted to cooperate in contact with the tube during sealing thereof, in particular a sealing device of a packaging assembly configured to fill, form, seal, separate and fold packages containing the pourable product starting from the above-mentioned tube of packaging material.

BACKGROUND ART

As it is generally known, many pourable food products, such as fruit juice, UHT (ultra-high temperature-treated) milk, wine, tomato sauce, etc., are sold in packages made of sterilized packaging material.

A typical example is the parallelepiped-shaped package for pourable food products known as Tetra Brik Aseptic (registered trademark), which is made by folding and sealing a laminated web of packaging material. The packaging material has a multilayer structure comprising a base layer, e.g. made of paper, covered on both sides with layers of heat-seal plastic material, e.g. polyethylene.

In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Such packages are usually produced in fully automatic packaging assemblies, in which a continuous tube is formed from a web of packaging material initially wound in a reel and fed to such packaging assembly. The web of packaging material is sterilized in the packaging assembly, e.g. by applying a chemical sterilizing agent, such as hydrogen peroxide solution, which, once sterilization is completed, is removed from the surfaces of the packaging material, e.g. evaporated by heating. The web so sterilized is then maintained in a closed, sterile environment, and is folded and sealed longitudinally to form the tube.

The tube is fed continuously along a first direction, normally a straight vertical direction, is filled with the sterilized food product from above and is formed, sealed and subsequently cut along equally spaced transversal cross sections extending along a second direction, normally a direction orthogonal to the first direction. Pillow packs are obtained thereby, which have a longitudinal sealing band, a top transversal sealing band and a bottom transversal sealing band. The pillow packs are then cut and separated from one another and directed to a folding device of the packaging assembly for the final folding thereof.

In order to perform the forming and sealing operations, the known packaging assemblies comprise a forming device configured to form the tube and a sealing device configured to seal the tube at equally spaced cross-sections orthogonal to the tube advancement direction.

The forming device comprises at least one pair of forming members, typically in the form of shells, arranged at opposite lateral sides of the tube of packaging material, facing one another and cyclically surrounding, in use, successive portions of the tube to sequentially form a predetermined external shape onto these portions.

The sealing device is conveniently arranged downstream of the forming device and comprises at least one pair of sealing members, typically in the form of jaws, arranged at opposite lateral sides of the tube of packaging material facing one another and cyclically gripping between them, in use, successive equally spaced transversal cross-sections of the tube to sequentially seal the tube at these transversal cross-sections, thereby forming the pillow packs.

In detail, the sealing device comprises a sealing member carrying heating means and a countersealing member defining a countersurface for the heating means to abut against.

In greater detail, each tube portion gripped between the jaws is heat sealed by the heating means, which locally melt, in use, the heat-sealable plastic material in the gripped region.

Packaging material in which the layer of barrier material is defined by a sheet of electrically conductive material, e.g. a sheet of aluminum, is normally heat sealed by a well-known induction heat-seal process, in which, when the tube is gripped between the sealing member and the counterseal-ing member, electric current is induced in the sheet of aluminum to heat the sheet of aluminum locally and so locally melt the heat-sealable plastic material.

More specifically, in induction heat sealing, the heating means substantially comprise an inductor, which is carried by the sealing member, is supplied by a high-frequency current generator, and is substantially defined by a coil comprising one or more inducting bars made of electrically conductive material, extending parallel to the second direction, and which interact with and induce an electric current in the packaging material to heat the packaging material to the required heat-seal temperature.

In a known embodiment, the inductor includes, frontally, two straight, elongated active surfaces extending parallel to the second direction and on opposite sides of an intermediate plane perpendicular to the first direction, i.e. parallel to the second direction.

In particular, the active surfaces are located in respective front contact surfaces of the sealing member, extending on opposite sides of a central recess and facing, in use, the tube of packaging material and, through the tube, the counter-surface of the countersealing member.

The countersealing member comprises two pressure elements, in particular two pressure pads made of elastomeric material, extending on opposite sides of and parallel to the intermediate plane, and having respective front contact surfaces defining the above-mentioned countersurface.

In detail, the elastomeric pressure pads cooperate with the respective front contact surfaces of the sealing member, and therefore with the respective active surfaces of the inductor, to heat seal the tube along respective portions of the tube defining transversal sealing bands.

Once the heat-seal operation is completed, a cutting member carried by one of the two jaws, normally the countersealing member, is activated, thereby interacting with the tube of packaging material to cut the tube along the respective previously created sealing band, and so separating (cutting) a pillow pack off the bottom end of the tube of packaging material. Typically, the cutting member is extracted from a slot arranged between the two pressure pads to engage the central recess of the sealing member.

Once the cutting operation is complete, the sealing member and the countersealing member are moved away from one another to be ready to grip another portion of the tube.

It is known in the field the use of pressure pads having flat front contact surface and the use of pressure pads having curved front contact surface. This latter configuration is particularly used when packaging food pourable product containing small solid particles, as described in EP-A-2917021 from the same Applicant.

In this last case, the pressure pads have convex front contact surfaces, which are arranged symmetrically with respect to the intermediate plane, i.e. with respect to the slot housing the cutting member.

Even though the known pressure pads and countersealing members work satisfyingly well, a need is felt in the industry to further improve such pressure pads and countersealing members, in particular so as to ensure an effective sealing of the packaging material.

DISCLOSURE OF INVENTION

It is therefore an object of the present invention to provide a pressure element for a sealing device which is designed to meet the above-mentioned need in a straightforward and low-cost manner.

This object is achieved by a pressure element as claimed in claim 1.

It is a further object of the present invention to provide a countersealing member which is designed to meet the above-mentioned need in a straightforward and low-cost manner.

This object is achieved by a countersealing member as claimed in claim 8.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
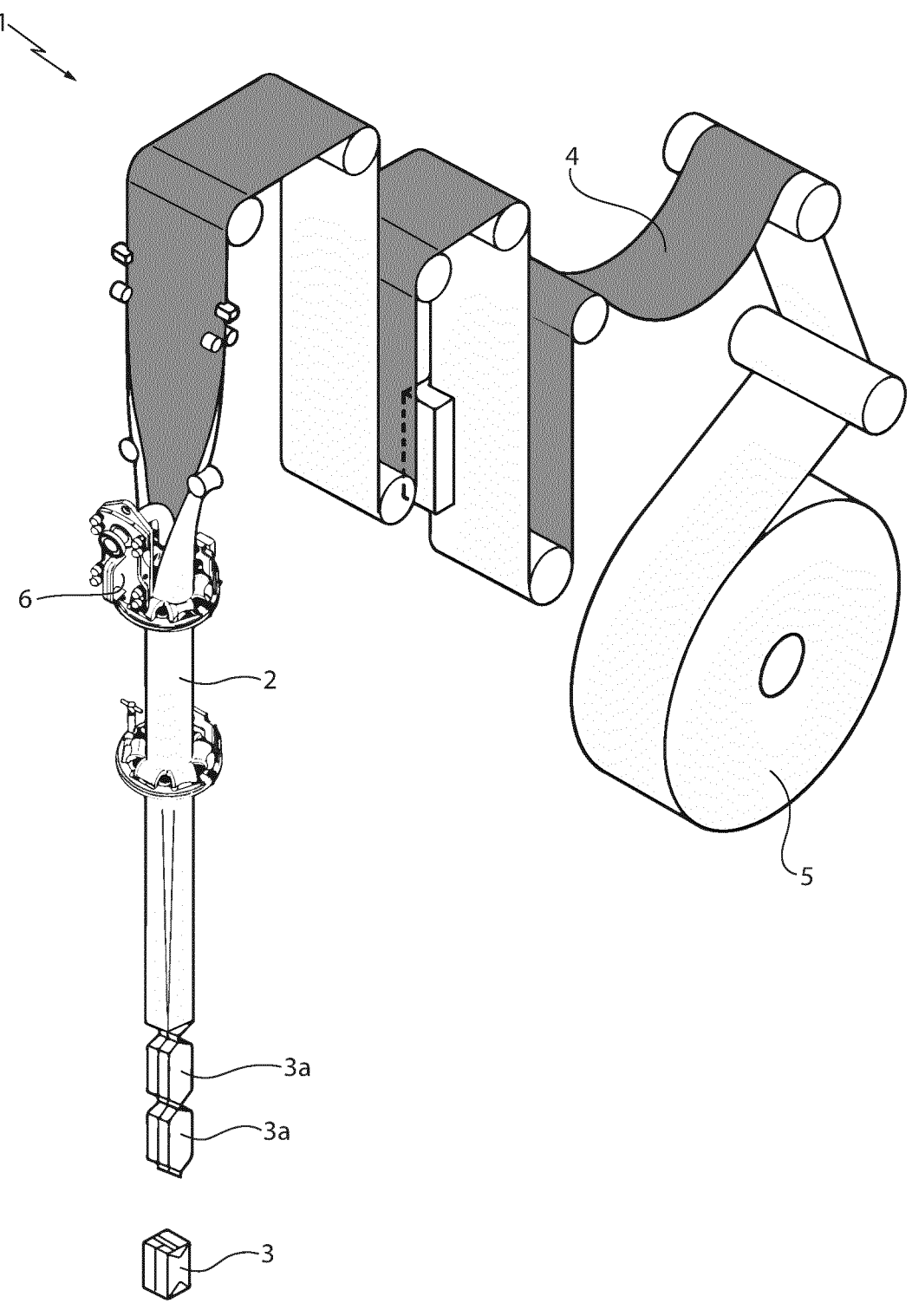
FIG. 1 is a perspective schematic view, with parts removed for clarity, of a packaging assembly configured to produce packages containing a pourable product and comprising a sealing device having a pressure element according to the present invention.

With reference to FIG. 1, number 1 indicates as a whole a packaging assembly configured to form a tube 2 for producing sealed packages 3 containing a pourable product, preferably a pourable food product such as pasteurized or UHT milk, fruit juice, wine, peas, beans, etc., starting from a web-like sheet 4 of packaging material.

In detail, packaging assembly 1 is configured to continuously produce packages 3 from sheet 4 of packaging material, which is unwound off a reel 5 and fed along a forming path.

The packaging material has a multilayer structure (not shown), and comprises a layer of fibrous material, e.g. paper, covered on both sides with respective layers of heat-seal plastic material, e.g. polyethylene.

In the case of aseptic packages 3 for long-storage products, such as UHT milk, the packaging material also comprises a layer of gas-and-light barrier material, e.g. aluminum foil or ethylene vinyl alcohol (EVOH) film, which is superimposed on a layer of heat-seal plastic material, and is in turn covered with another layer of heat-seal plastic material, the latter forming the inner face of the package 3 eventually contacting the pourable product.

After being unwound off reel 5 and before being formed into tube 2, sheet 4 of packaging material is sterilized, e.g. by applying a chemical sterilizing agent, such as hydrogen peroxide solution, which, once sterilization is completed, is removed from the surfaces of the packaging material, e.g. evaporated by heating.

Packaging assembly 1 is configured to perform, sequentially, the following operations:

longitudinally folding sheet 4 of packaging material to obtain tube 2 by means of folding means 6, known per se and not described in detail and longitudinally sealing tube 2 to form a longitudinal sealing band;

forming tube 2 at successive portions thereof to impart (give) a predetermined external shape to such portions;

transversally sealing tube 2 at equally-spaced cross sections, so that pillow packs 3a are obtained;

cutting tube 2 at the above-mentioned cross sections to separate pillow packs 3 from one another; and folding pillow packs 3a to obtain fully folded packages 3.

Tube 2 is fed continuously along a first direction, in particular a straight vertical direction and is filled, once longitudinally sealed, with the sterilized pourable product.

In order to perform the forming operation, packaging assembly 1 comprises a known forming device (not shown) including at least one pair of forming elements, for example shell-like members, arranged at opposite lateral sides of tube 2 facing one another and cyclically surrounding, in use, successive portions of tube 2 to sequentially impart (give) a predetermined external shape to the portions.

Figure 2:
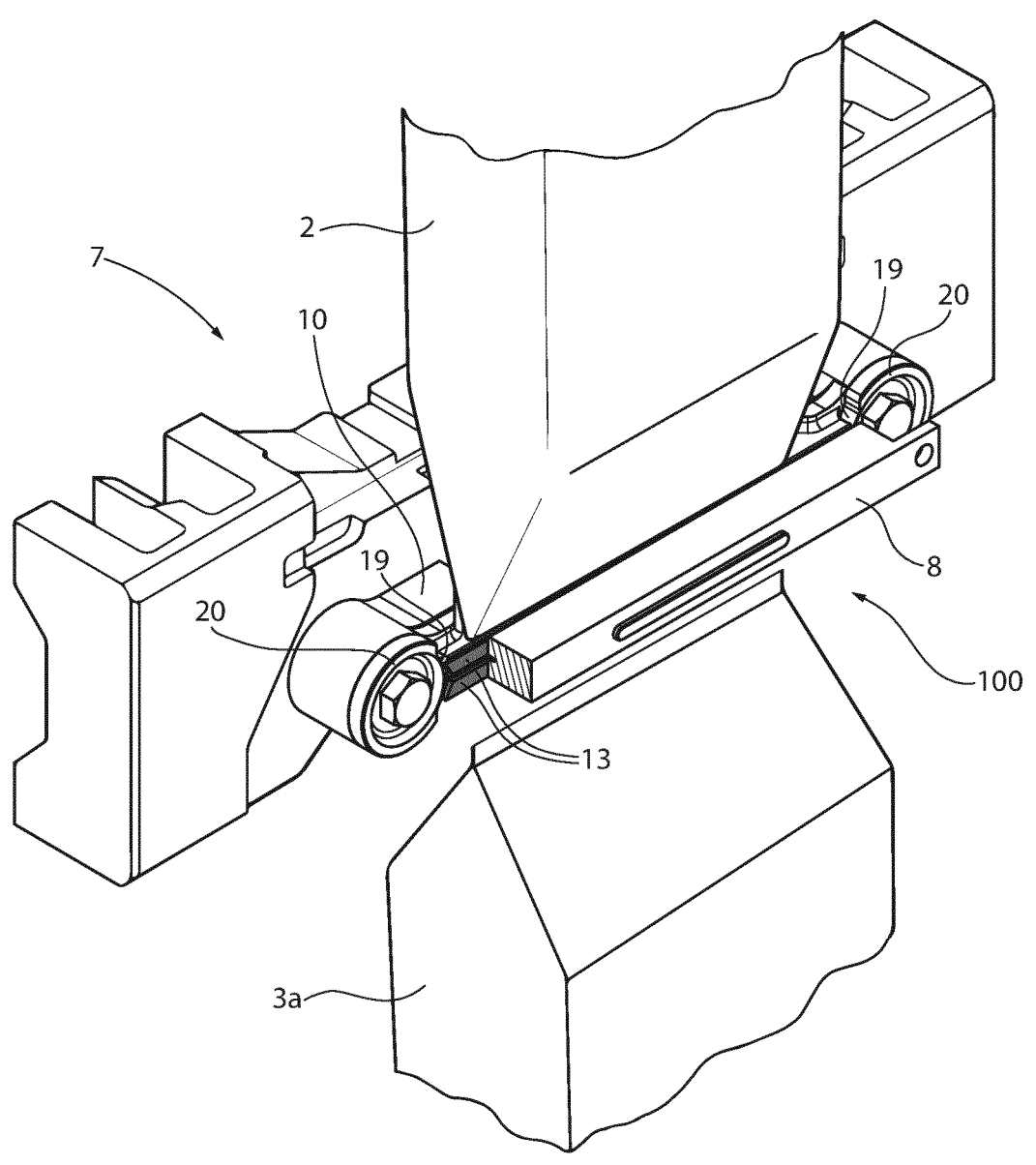
FIG. 2 is a larger-scale perspective view, with parts removed for clarity, of a sealing device having two pressure elements according to the present invention.
Figure 3:
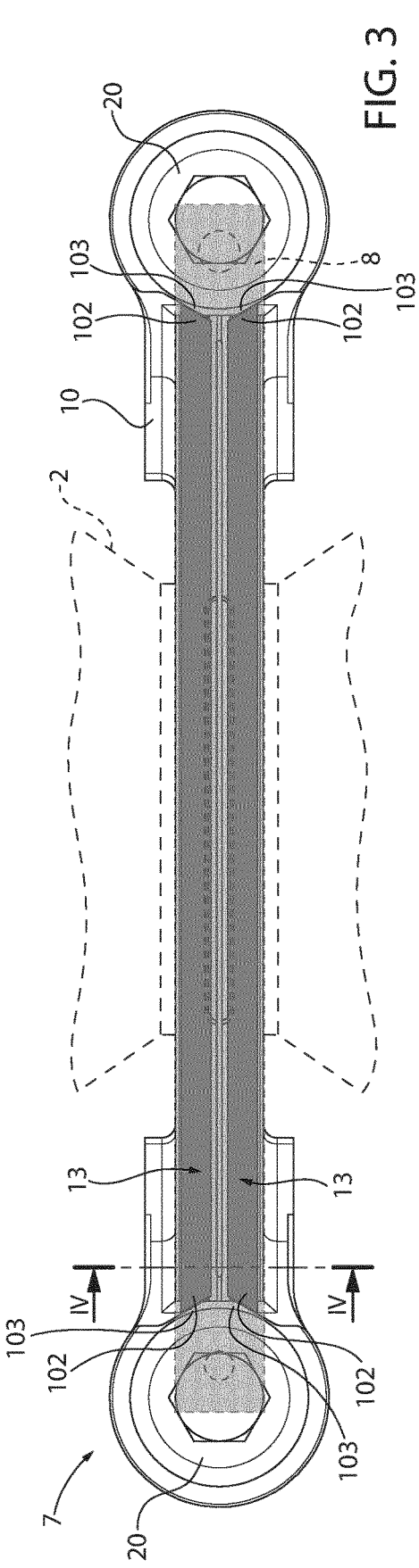
FIG. 3 is a larger-scale front view, with parts removed for clarity, of the sealing device of FIG. 2.

To perform the sealing operation, packaging assembly 1 comprises a sealing device 7 of the type shown in FIGS. 2 and 3.

In detail, sealing device 7 is conveniently arranged operationally downstream of the forming device and comprises at least one pair of sealing arrangements 100 in the form of opposing jaws arranged at opposite lateral sides of tube 2 facing one another and cyclically gripping, in use and between them, successive equally-spaced cross sections of tube 2 to sequentially seal tube 2 at these cross sections, thereby obtaining the sealed pillow packs 3a.

In greater detail, sealing device 7 (in particular sealing arrangements 100) comprises: a sealing member 8 carrying at least one sealing element 11, in particular two sealing elements 11, and a countersealing member 10 defining a countersurface for the sealing elements 11, the sealing member 8 and the countersealing member 10 facing one another with interposition of tube 2 therebetween.

According to this non-limiting preferred embodiment, the layer of barrier material of the packaging material is defined by a sheet of electrically conductive material, e.g. a sheet of aluminum. Hence, the packaging material is heat sealed by a known induction heat-seal process, in which, when tube 2 is gripped between the sealing member 8 and the countersealing member 10, electric current is induced in the sheet of aluminum to heat the sheet of aluminum locally and so locally melt the heat-sealable plastic material.

Figure 4:
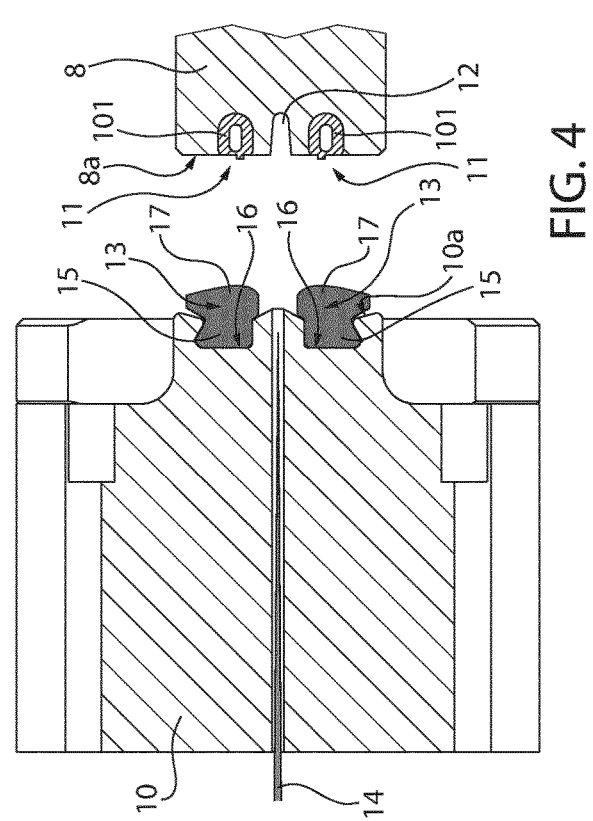
FIG. 4 is a larger-scale section, with parts removed for clarity, along the line IV-IV of FIG. 3.

To this end, as visible in FIG. 4, sealing member 8 comprises at least one inductor, in particular a pair of inductors 101 defining the above-mentioned sealing elements 11 and arranged on a respective front surface 8*a* of sealing member 8 facing countersealing member 10.

In one preferred embodiment, inductors 101 are defined by coils made of electrically conductive material.

Each inductor 101 is supplied, in use, by a high-frequency current generator (not shown) and is substantially defined by one or more inducting bars made of electrically conductive material, extending parallel to a second direction orthogonal to the first direction (i.e. to the feeding direction of tube 2), and which interact with and induce an electric current in the electrically conductive material of tube 2 to heat the electrically conductive material to the required heat-seal temperature.

More precisely, each inductor 101 defines an active surface extending parallel to the second direction and along the front surface 8*a* of sealing member 8.

In the example shown, inductors 101 are located, along the front surface 8*a*, on opposite sides of a central recess 12 configured to receive a cutting element 14 in a manner better described in the following.

Countersealing member 10 comprises at least one, in particular two pressure elements, more in particular two pressure pads 13 made of elastomeric material and carried at a front surface 10*a* of countersealing member 10 facing the front surface 8*a* of sealing member 8.

In particular, each pressure pad 13 has an elongated shape parallel to the second direction, so as to face a corresponding inductor 101 of the sealing member 8.

Accordingly, each pressure pad 13 is configured to interact with a respective inductor 101 facing the pressure pad 13 to press tube 2 therebetween and heat seal tube 2 along the above-mentioned cross sections.

In other words, sealing member 8 and countersealing member 10 are movable towards and away from one another so that inductors 101 press onto pressure pads 13 with the interposition of tube 2, in order to seal tube 2 at the above-mentioned cross sections.

As visible in FIG. 4, countersealing member 10 carries cutting element 14 arranged in a respective slot between the pressure pads 13, relatively to the first direction, and extractable from this slot to sequentially cut tube 2 at the sealed cross sections.

In greater detail, once the heat-seal operation is completed, cutting element 14 is extracted from its slot and moved along a third direction orthogonal to the first direction and to the second direction towards sealing member 8, so as to cut the sealed cross section of tube 2 and engage recess 12.

Accordingly, one sealed pillow pack 3*a* containing the pourable product is separated off the bottom end of tube 2.

Once the cutting operation is complete, sealing member 8 and countersealing member 10 are moved away from one another to be ready to grip another portion of tube 2.

As visible in FIG. 4, each pressure pad 13 comprises:

a fitting portion 15 coupled to countersealing member 10, in particular fitted into a respective groove 16 of countersealing member 10 preferably obtained on the front surface 10*a* of countersealing member 10; and a contact portion 17 opposite to fitting portion 15 and defining a front contact surface facing sealing member 8 and configured to interact with the respective inductor 101 to press and seal tube 2 therebetween.

According to an aspect of the present invention, each pressure pad 13 comprises at least one engagement element 102 configured to cooperate with a complementary engagement element 103 carried by countersealing member 10 to guide the pressure pad 13 according to a predetermined orientation during fitting of such pressure pad 13 to countersealing member 10, in particular into the relative groove 16 of countersealing member 10.

In particular, countersealing member 10 further comprises a guide element 20 having a guide wall 19 defining complementary engagement element 103.

According to the non-limiting embodiment shown, each pressure pad 13 has a shaped portion 18, distinct from the fitting portion 15 and from the contact portion 17, defining the relative engagement element 102 and configured to cooperate in contact with guide wall 19 at least during fitting of the relative pressure pad 13 to the countersealing member 10.

More specifically, each shaped portion 18 is configured to engage the respective guide wall 19 to define a geometric constraint for fitting the relative pressure pad 13 carrying such shaped portion 18 to countersealing member 10 according to the aforementioned predetermined orientation, while preventing the fitting thereof according to any other orientation different from the predetermined orientation.

In the example shown, each shaped portion 18 has an inclined surface 18*a* which is inclined with respect to a plane orthogonal to the second direction and is configured to cooperate in contact with guide wall 19. Such guide wall 19 is correspondingly inclined to guide the relative pressure pad 13 according to the predetermined orientation during fitting of the pressure pad 13 to countersealing member 10.

Conveniently, each inclined surface 18*a* and the portion of guide wall 19 which each inclined surface 18*a* is configured to cooperate with have the same inclination relative to the aforementioned plane, i.e. they are parallel to one another.

Figure 5:
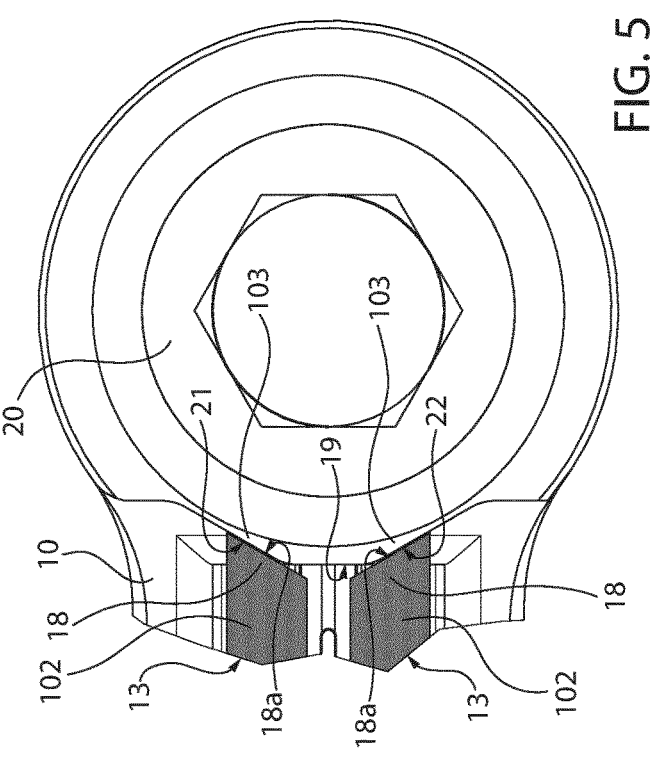
FIG. 5 is a larger-scale front view of a detail of the sealing device of FIG. 3.

As shown in FIG. 5, each shaped portion 18 defines a free end portion of the respective pressure pad 13, relative to the second direction; therefore, each inclined surface 18*a* is arranged at one free end of the respective pressure pad 13.

Accordingly, guide wall 19 is arranged at a lateral side of the relative pressure pad 13 adjacent to the free end defined by the respective inclined surface 18*a*, so that each inclined surface 18*a* is parallel to the portion of guide wall 19 with which it is configured to cooperate.

As visible in FIG. 5, the inclined surface 18*a* of one pressure pad 13 has an inclination different, in particular opposite, to the inclination of the inclined surface 18*a* of the other pressure pad 13, with respect to the plane orthogonal to the second direction.

Accordingly, guide wall 19 comprises:

a first inclined wall 21 configured to cooperate in contact with the inclined surface 18*a* of the one pressure pad 13 to guide the one pressure pad 13 according to a first predetermined orientation during its fitting to countersealing member 10; and a second inclined wall 22 configured to cooperate in contact with the inclined surface 18*a* of the other pressure pad 13 to guide the other pressure pad 13 according to a second predetermined orientation during its fitting to countersealing member 10.

In practice, first inclined wall 21 is parallel to the inclined surface 18*a* of the one pressure pad 13 and second inclined wall 22 is parallel to the inclined surface 18*a* of the other pressure pad 13, so that each pressure pad 13 can only be fitted to countersealing member 10 according to its predetermined orientation only.

This configuration is particularly advantageous in the case in which the two pressure pad 13 have respective contact portions 17 that are for example curve, convex and arranged symmetrically with respect to the slot of the cutting element 14, as shown in FIG. 4.

In this last case, an erroneous fitting of one pressure pad 13, for example an upside-down fitting of one or both of the pressure pads 13, could result in a non-nominal positioning of its contact portion 17. This could cause a defective sealing which could potentially lead to unwanted leakages or to compromising the aseptic properties of packages 3.

As visible in FIG. 3, guide element 20 is conveniently mounted at front surface 10*a* of countersealing member 10. Hence, guide wall 19 is also arranged at front surface 10*a*.

This configuration further simplifies the correct fitting of pressure pads 13 to countersealing member 10, since the operator can easily verify if inclined surfaces 18*a* of pressure pads 13 are correctly cooperating with the respective portion 21, 22 of guide wall 19, so that each pressure pad 13 is being installed with its predetermined orientation.

According to the non-limiting preferred embodiment shown, each pressure pad 13 comprises a pair of inclined surfaces 18*a* arranged at respective opposite free ends of the pressure pad 13 itself, located at opposite sides thereof.

In detail, the two inclined surfaces 18*a* of each pressure pad 13 define two opposite lateral sides of the one pressure pad 13 having different inclinations, in particular equal and opposite inclinations, with respect to the above-mentioned plane orthogonal to the second direction.

In greater detail, the two inclined surfaces 18*a* of each pressure pad 13 are converging towards the other pressure pad 13, when the pressure pads 13 are mounted on countersealing member 10.

In practice, pressure pads 13 have a profile, relative to a plane parallel to the second direction, defining the shape of an isosceles trapezoid with the minor bases facing one another.

Alternatively, the two inclined surfaces 18*a* of the one pressure pad 13 are diverging towards the other pressure pad 13.

In this case, pressure pads 13 have a profile, relative to a plane parallel to the second direction, defining the shape of an isosceles trapezoid with the major bases facing one another.

Accordingly, countersealing member 10 has two guide elements 20 arranged at respective lateral sides of pressure pads 13 and each carrying a respective guide wall 19 having a first inclined wall 21 and a second inclined wall 22, to guide each pressure pad 13 at both (lateral) sides thereof according to their respective predetermined orientation during fitting of the pressure pad 13 into the respective groove 16 of countersealing member 10.

During fitting of the pressure pads 13 into grooves 16 of countersealing member 10, engagement elements 102, i.e. shaped portions 18, i.e. inclined surfaces 18*a*, cooperate with the respective complementary engagement elements 103 carried by guide elements 20, i.e. cooperate in contact with the respective first wall 21 and second wall 22 of guide walls 19.

The advantages of pressure pad 13 and countersealing member 10 according to the present invention will be clear from the foregoing description.

In particular, the fact that each pressure pad 13 has an engagement element 102, i.e. at least one inclined surface 18*a*, configured to cooperate with a complementary engagement element 103, i.e. the guide wall 19, carried by countersealing member 10, ensures that each pressure pad 13 is fitted properly to countersealing member 10 and according to its predetermined orientation only, thereby reducing or even virtually cancelling out the chances of an erroneous fitting by an operator. In this way, a correct and effective sealing of the packaging material can be ensured.

Clearly, changes may be made to countersealing member 10 and pressure pad 13 as described herein without, however, departing from the scope of protection as defined in the accompanying claims.

In particular, for each pressure pad 13, engagement element 18 may be defined by a shaped portion matching a correspondingly shaped groove carried by countersealing member 10. For example, engagement element 18 may be defined by a hook-shaped protrusion configured to engage a correspondingly hook-shaped groove carried by countersealing member 10, e.g. obtained in guide element 20.

The invention claimed is:

1. Pressure element for a sealing device having a sealing member and a countersealing member facing one another and configured to be pressed against one another to seal therebetween a tube of packaging material adapted to be filled with a pourable product, the pressure element comprising:

a fitting portion configured to be fitted to the countersealing member and a contact portion defining a contact surface facing, in use, the sealing member and configured to interact with a sealing element of the sealing member to press and seal the tube therebetween;

the pressure element also comprising at least one engagement element configured to cooperate with a complementary engagement element carried by the countersealing member to guide the pressure element according to a predetermined orientation during fitting of the pressure element to the countersealing member and to prevent fitting of the pressure element to the countersealing member in any other orientation different from the predetermined orientation, the at least one engagement element of the pressure element that is configured to cooperate with the complementary engagement element carried by the countersealing member being distinct from the fitting portion and the contact portion; and the pressure element being an elongated pressure element that extends in a first direction from one free end of the elongated pressure element to an opposite free end of the elongated pressure element, the at least one engagement element of the elongated pressure element being a free end portion of the elongated pressure element that is located at the one free end of the of the elongated pressure element and that projects away from the opposite free end of the elongated pressure element.

2. Pressure element as claimed in claim 1, wherein the at least one engagement element of the pressure element includes a shaped portion configured to cooperate in contact with a guide wall defined by the complementary engagement element carried by the countersealing member at least during fitting of the pressure element to the countersealing member.

3. Pressure element as claimed in claim 2, wherein the shaped portion of the pressure element has an inclined surface inclined with respect to a plane orthogonal to the first direction and configured to cooperate in contact with a correspondingly inclined wall defined by the guide wall to guide the pressure element according to the predetermined orientation during fitting of the pressure element to the countersealing member.

4. Pressure element as claimed in claim 3, wherein the inclined surface of the pressure element is arranged at the one free end of the pressure element;

said inclined wall being arranged, in use and when the pressure element is fitted to the countersealing member, adjacent to said one free end at a side thereof.

5. Pressure element as claimed in claim 4, wherein the inclined surface of the pressure element is a first inclined surface, and comprising a second inclined surface at the opposite free end of the pressure element, the first and second inclined surfaces being configured to cooperate in contact with respective inclined walls carried by the countersealing member to guide the pressure element according to the predetermined orientation at both sides thereof during fitting of the pressure element to the countersealing member.

6. Pressure element as claimed in claim 2, wherein the shaped portion is configured to engage the guide wall to define a geometric constraint for fitting the pressure element to the countersealing member according to the predetermined orientation.

7. Pressure element as claimed in claim 1, the pressure element being made of an elastomeric material.

8. Pressure element as claimed in claim 1, wherein the elongated pressure element has two sides that each extend along the first direction from the one free end of the elongated pressure element to the opposite free end of the elongated pressure element as seen in a plan view of the elongated pressure element, the at least one engagement element of the elongated pressure element being an inclined surface of the elongated pressure element, the inclined surface of the elongated pressure element being inclined at either an acute angle or an obtuse angle relative to the sides of the elongated pressure element as seen in the plan view of the elongated pressure element.

9. Countersealing member of a sealing device configured to seal a tube of packaging material adapted to be filled with a pourable product, the countersealing member facing, in use, a sealing member of the sealing device with interposition of the tube and being configured to be pressed against the sealing member to seal the tube therebetween, the countersealing member comprising:

at least one pressure element including a fitting portion fitted to the countersealing member at a groove thereof and a contact portion opposite to the fitting portion and defining a contact surface facing, in use, the sealing member and configured to interact with a sealing element of the sealing member to press and seal the tube therebetween;

the pressure element comprising at least one engagement element in cooperation with a complementary engagement element carried by the countersealing member, the at least one engagement element of the pressure element allowing the pressure element to be fitted into the groove of the countersealing member according to a predetermined orientation while also preventing fitting of the pressure element into the groove of the countersealing member in any other orientation different from the predetermined orientation;

the at least one engagement element of the pressure element that is in cooperation with the complementary engagement element carried by the countersealing member being distinct from the fitting portion and the contact portion;

the pressure element having an elongated shape that extends along a first direction from one free end of the pressure element to an opposite free end of the pressure element; and the at least one engagement element of the pressure element being an inclined surface that is inclined with respect to a plane orthogonal to the first direction, and the complementary engagement element carried by the countersealing member being correspondingly inclined with respect to said plane and being configured to cooperate in contact with the inclined surface of the at least one engagement element to guide the pressure element during fitting of the pressure element according to the predetermined orientation into the groove of the countersealing member.

10. Countersealing member as claimed in claim 9, wherein the inclined surface of the pressure element is arranged at the one free end of the pressure element;

said complementary engagement element being a guide wall that is arranged at a lateral side of the pressure element adjacent to said one free end, the guide wall and the inclined surface being parallel to one another.

11. Countersealing member as claimed in claim 10, wherein the pressure element is a first pressure element, the groove of the countersealing member is a first groove, the predetermined orientation is a first predetermined orientation, the at least one engagement element is a first engagement element, the complementary engagement element carried by the countersealing member is a first complementary engagement element, the fitting portion is a first fitted portion and the contact portion is a first contact portion; and comprising a second pressure element spaced apart from the first pressure element along a second direction orthogonal to the first direction;

the second pressure element including a second fitting portion fitted to the countersealing member at a second groove thereof and a second contact portion opposite to the second fitting portion and defining a contact surface facing, in use, the sealing member and configured to interact with a sealing element of the sealing member to press and seal the tube therebetween;

the second pressure element having an elongated shape that extends along the first direction from one free end of the second pressure element to an opposite free end of the second pressure element;

the second pressure element comprising at least one second engagement element in cooperation with a second complementary engagement element carried by the countersealing member, the at least one second engagement element of the second pressure element allowing the second pressure element to be fitted into the second groove of the countersealing member according to a second predetermined orientation while also preventing fitting of the second pressure element into the second groove of the countersealing member in any other orientation different from the second predetermined orientation, the at least one second engagement element including a shaped portion;

the at least one second engagement element of the second pressure element being distinct from the second fitting portion and the second contact portion, the shaped portion of the at least one second engagement element of the second pressure element having a second inclined surface inclined with respect to a plane orthogonal to the first direction; wherein the inclined surface of the first pressure element has an inclination different from an inclination of the second inclined surface of the second pressure element, with respect to the first direction;

and wherein the guide wall comprises:

a first inclined wall configured to cooperate in contact with the inclined surface of the first pressure element to guide the first pressure element according to the first predetermined orientation during fitting of the first pressure element to the countersealing member; and a second inclined wall configured to cooperate in contact with the second inclined surface of the second pressure element to guide the second pressure element according to the second predetermined orientation during fitting of the second pressure element to the countersealing member.

12. Countersealing member as claimed in claim 11, wherein the second pressure element comprises a pair of inclined surfaces arranged at respective opposite free ends of the second pressure element;

and wherein the countersealing member comprises a pair of second guide walls, each one arranged at a respective lateral side of the second pressure element adjacent to one respective free end to guide the second pressure element during fitting of the second pressure element into the second groove of the countersealing member.

13. Sealing device configured to seal a tube of packaging material adapted to be filled with a pourable product, the sealing device comprising:

a sealing member carrying at least one sealing element; and a countersealing member as claimed in claim 9;

the sealing element and the pressure element facing one another and being configured to be pressed against one another to seal the tube therebetween.

14. Packaging assembly configured to produce packages containing pourable product starting from a tube of packaging material and comprising a sealing device having:

a sealing member carrying at least one sealing element; and a countersealing member as claimed in claim 9;

the sealing element and the pressure element facing one another and being configured to be pressed against one another to seal the tube therebetween.

15. Countersealing member of a sealing device configured to seal a tube of packaging material adapted to be filled with a pourable product, the countersealing member being elongated and having a front surface that faces, in use, a sealing member of the sealing device with interposition of the tube and being configured to be pressed against the sealing member to seal the tube therebetween, the countersealing member comprising:

a groove formed in the countersealing member, extending from the front surface of the countersealing member to a bottom of the groove;

an elongated pressure element extending in a first direction from one free end of the elongated pressure element to an opposite free end of the elongated pressure element, the elongated pressure element including an elongated fitting portion positioned in the groove and an elongated contact portion opposite to the fitting portion and defining a contact surface facing, in use, the sealing member and configured to interact with a sealing element of the sealing member to press and seal the tube therebetween, the elongated pressure element also including an undersurface that faces away from the contact surface and that at least in part contacts the front surface of the countersealing member;

the pressure element comprising an engagement element that has a configuration complementary to an engagement element that is carried by the countersealing member, the engagement element of the pressure element cooperating with the engagement element carried by the countersealing member to ensure the pressure element is fitted properly to the countersealing member according to its predetermined orientation only while also preventing the pressure element from being fitted to the countersealing member in any other orientation different from the predetermined orientation; and the engagement element of the pressure element that is in cooperation with the engagement element carried by the countersealing member being distinct from the fitting portion and from the contact portion, and being different from the undersurface of the elongated pressure element.

16. Countersealing member as claimed in claim 15, wherein the one free end of the pressure element is an inclined surface that is inclined with respect to a plane orthogonal to the first direction, the engagement element that is carried by the countersealing member also having an inclined surface that is inclined with respect to the plane orthogonal to the first direction, an inclination of the inclined surface of the pressure element and an inclination of the inclined surface of the engagement element that is carried by the countersealing member being the same so that the inclined surface of the pressure element and the inclined surface of the engagement element that is carried by the countersealing member are parallel.

17. Countersealing member as claimed in claim 16, wherein the inclined surface of the pressure element is a first inclined surface of the pressure element and the inclined surface of the engagement element that is carried by the countersealing member being a first inclined surface of the countersealing member, the opposite free end of the pressure element being a second inclined surface that is inclined with respect to a plane orthogonal to the first direction, the second inclined surface of the pressure element being in contact with and parallel to a second inclined surface of the countersealing member.

18. Countersealing member as claimed in claim 17, wherein the first inclined surface of the pressure element and the second inclined surface of the pressure element have equal and opposite inclinations.

19. Countersealing member as claimed in claim 15, wherein the groove formed in the countersealing member is a first groove, the elongated pressure element is a first elongated pressure element, the fitting portion is a first fitting portion and the contact portion is a first contact portion, and the engagement element carried by the countersealing member is a first engagement element;

further comprising:

a second elongated pressure element extending from one free end of the second elongated pressure element to an opposite free end of the second elongated pressure element, the second elongated pressure element including a second elongated fitting portion positioned in a second groove formed in the countersealing member and a second elongated contact portion opposite to the second fitting portion and defining a contact surface facing, in use, the sealing member and configured to interact with another sealing element of the sealing member to press and seal the tube therebetween, the second elongated pressure element also including an undersurface that faces away from the second contact surface and that at least in part contacts the front surface of the countersealing member; the second pressure element comprising an inclined surface cooperating with an inclined surface of the second engagement element carried by the countersealing member, the inclined surface of the second pressure element and the inclined surface of the second engagement element being parallel to one another.

20. Pressure element for a sealing device having a sealing member and a countersealing member facing one another and configured to be pressed against one another to seal therebetween a tube of packaging material adapted to be filled with a pourable product, the pressure element comprising:

a fitting portion configured to be fitted to the countersealing member and a contact portion defining a contact surface facing, in use, the sealing member and configured to interact with a sealing element of the sealing member to press and seal the tube therebetween;

the pressure element also comprising at least one engagement element configured to cooperate with a complementary engagement element carried by the countersealing member to guide the pressure element according to a predetermined orientation during fitting of the pressure element to the countersealing member and to prevent fitting of the pressure element to the countersealing member in any other orientation different from the predetermined orientation, the at least one engagement element of the pressure element that is configured to cooperate with the complementary engagement element carried by the countersealing member being distinct from the fitting portion and the contact portion;

the at least one engagement element of the pressure element including a shaped portion configured to cooperate in contact with a guide wall defined by the complementary engagement element carried by the countersealing member at least during fitting of the pressure element to the countersealing member;

the pressure element having an elongated shape that extends along a first direction from one free end of the pressure element to an opposite free end of the pressure element; and the shaped portion of the pressure element having an inclined surface inclined with respect to a plane orthogonal to the first direction and configured to cooperate in contact with a correspondingly inclined wall defined by the guide wall to guide the pressure element according to the predetermined orientation during fitting of the pressure element to the countersealing member.

* * * * *